Sept. 29, 1959        S. DOMESHEK        2,906,036
FIELD MASK FOR STEREOSCOPIC PROJECTION ON MONOCULAR PROJECTOR
Filed March 27, 1956        3 Sheets-Sheet 1

INVENTOR.
SOL DOMESHEK
BY W.R. Maltby
Lawrence S. Epstein
ATTORNEYS

Sept. 29, 1959          S. DOMESHEK          2,906,036
FIELD MASK FOR STEREOSCOPIC PROJECTION ON MONOCULAR PROJECTOR
Filed March 27, 1956          3 Sheets-Sheet 2

INVENTOR.
SOL DOMESHEK
BY W R Maltby
Lawrence S. Epstein
ATTORNEYS

Sept. 29, 1959  S. DOMESHEK  2,906,036
FIELD MASK FOR STEREOSCOPIC PROJECTION ON MONOCULAR PROJECTOR
Filed March 27, 1956  3 Sheets-Sheet 3

INVENTOR.
SOL DOMESHEK
BY W.R. Maltby
Lawrence S. Epstein
ATTORNEYS

2,906,036
FIELD MASK FOR STEREOSCOPIC PROJECTION ON MONOCULAR PROJECTOR

Sol Domeshek, Great Neck, N.Y.

Application March 27, 1956, Serial No. 574,340

6 Claims. (Cl. 35—25)

(Granted under Title 35, U.S. Code (1952), sec. 266)

This application is a continuation-in-part of the co-pending application of Sol Domeshek, Serial No. 498,124 filed March 30, 1955 for Stereo Ranging Attachment for Large Transparency Projects.

The invention described herein may be manufactured and used by or for the Government of the United States of America for governmental purposes without the payment of any royalties thereon or therefor.

This invention relates to improvements in training devices and more particularly pertains to improvements in field masks for stereo projection for monocular projectors for teaching individuals to judge distances between a point of observation and an object being observed. The invention further pertains to improved methods of simulating telescopic range finder ranging.

The principal object of the invention is to closely simulate operational conditions obtained in ranging distant objects by stereoscopic means.

Another object is to train simultaneously a large number of individuals to become accurate in judging distances.

A further object is to simulate closely the scene visible to the individual when scanning through field glasses or telescopic rangefinder.

Another object is to range a specific element and then to read directly, by suitable calibrations, the distance of the object under observation from the observer.

Still another object is to provide a novel method for making the reticles and the stereo scene thin, yet rigid, resistant to damage, low in cost, accurate and still visible at all times.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
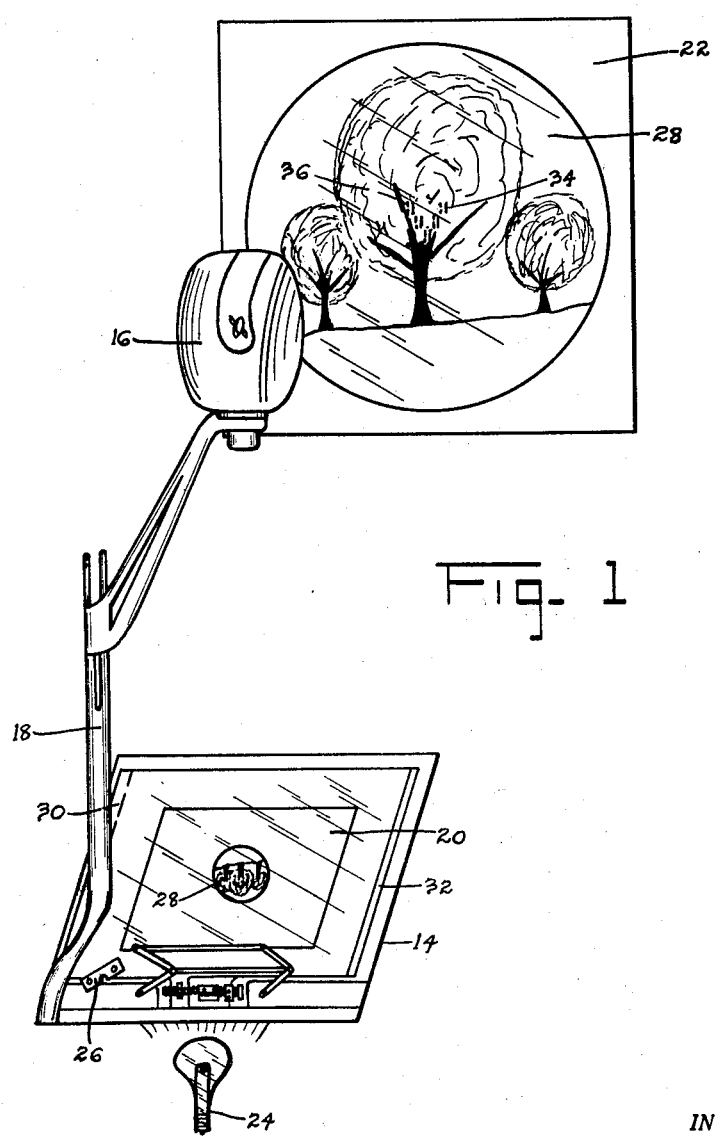
Fig. 1 is an elevation of a transparency projector that can be used with this invention, showing the ranging means of the invention in an operative position.
Figure 2:
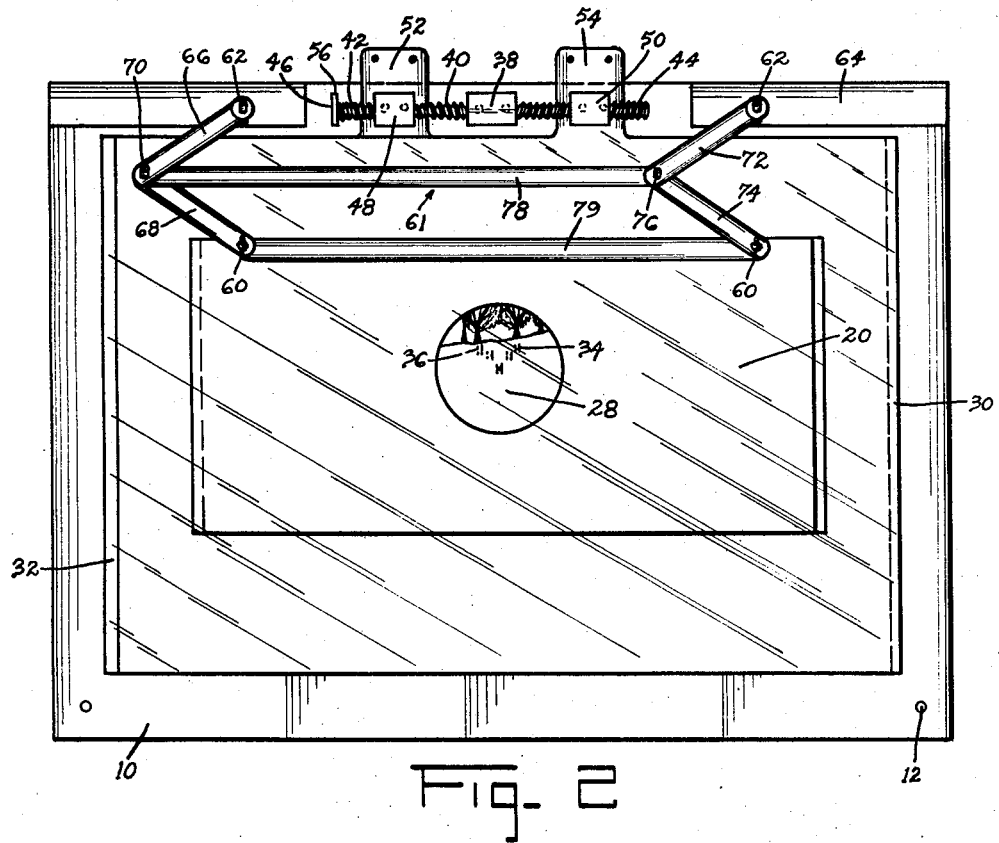
Fig. 2 is a plan view of the field mask.
Figure 3:
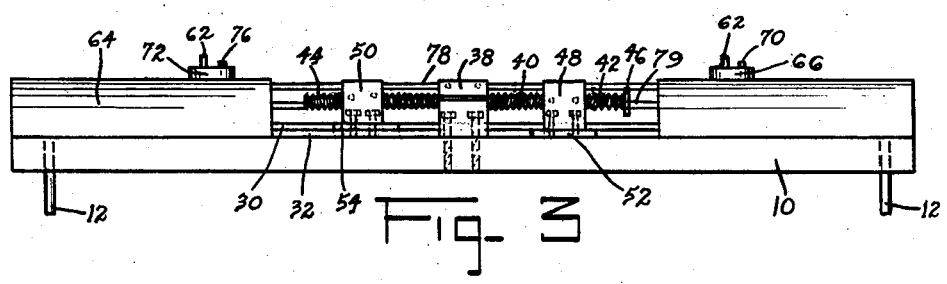
Fig. 3 is an end elevation of the field mask.
Figure 5:
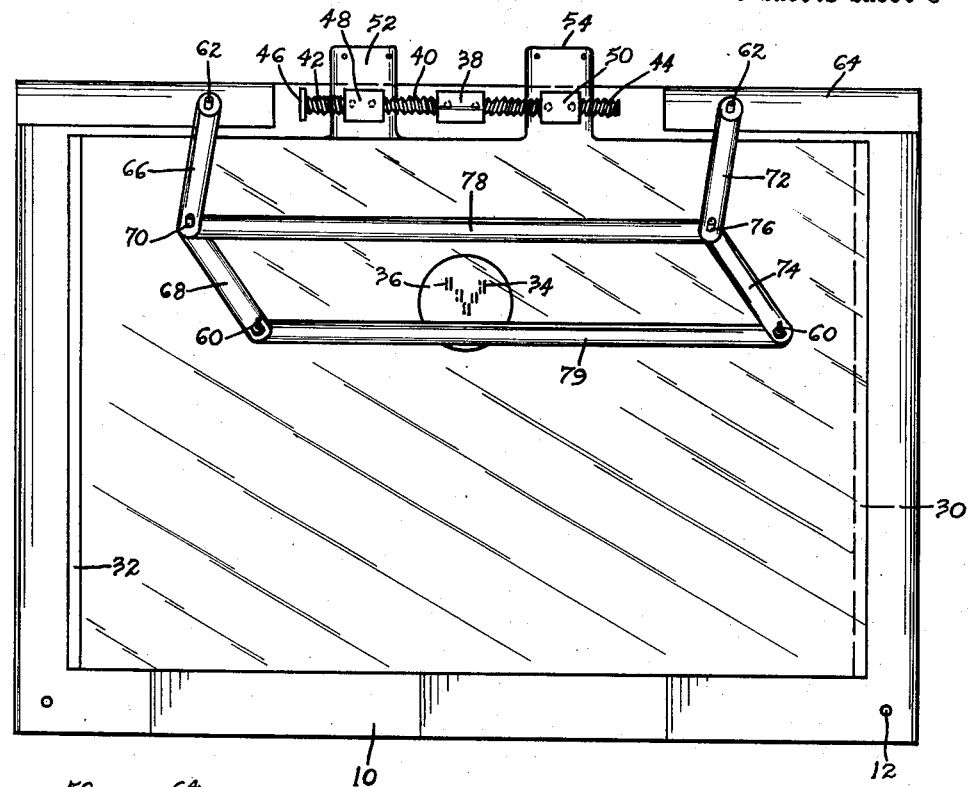
Fig. 5 is a view similar to Fig. 2, with the stereo scene removed.
Figure 4:
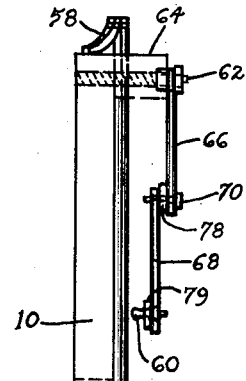
Fig. 4 is a side view of the field mask.

The stereoscopic training frame member 10 is mounted by means of retaining pins 12 on the focal plane 14 of the projector 16. The objective lens of projector 16 is supported on post 18 and is adapted to project the three dimensional view 20 on a screen 22 in magnified form. A suitable lamp 24 provides illumination. The stereoscopic viewing eye piece 26, supplied in order to observe the three-dimensional effect must be compatible with the stereo scene—that is, polaroid spectacles if polaroid stereo scene is used, or anaglyph spectacles if anaglyph stereo scene is used, etc.

Field mask or frame member 10 is provided with a central opening 28. Said opening 28 admits light produced by lamp 24 so that both the reticles and the stereoscopic scene to be ranged can be projected onto screen 22 for observation. Preferably, the area surrounding opening 28 is opaque or it may be painted in a dark color to provide the telescopic field effect. By the construction about to be described, the pair of stereo reticles is always in the center of viewing aperture or opening 28.

Stereo reticle plates 30 and 32 are provided with reticles 34 and 36 respectively. As noted earlier in discussing the stereo viewing spectacles 26, the slides must also be compatible with the stereo scene and must be polaroid if the scene is polaroid or anaglyph if the scene is anaglyph, etc. However, regardless of the system, the reticles must each be opaque to the light transmitted by the other, and, similarly, for the stereo spectacle eye pieces in each view of the stereo scene pair. When viewed on the screen 22, through stereo spectacles 26, reticles 34 and 36 blend and appear as a single reticle pattern to the observer.

The parallax distance between reticles 34 and 36 is adjusted by the movement of reticle plates 30 and 32. Motion of the reticle plates can only be parallel to the top and bottom edges of the rectangular field mask, this motion being known as parallax adjustment. While such adjustment can be carried out by hand, mechanical parallax motion means is preferred.

Bearing member 38, part of the parallax movement control means, is axially apertured and retains adjustment screw 40 therethrough. Threads 42 and 44 on adjustment screw 40 are pitched in opposed directions so that rotation of screw 40 by means of calibrated wheel or disk 46, secured at one end thereof, will provide opposite and equal movement of reticle plates 30 and 32. Traveling sleeve members 48 and 50 are bored axially and threaded in the same manner as sections 42 and 44 of adjustment screw 40.

An extension strip 52, extending from one edge of reticle plate 32, is welded or otherwise secured to sleeve member 48. Rotation of screw 40, together with the axial movement of sleeve 48, therefore causes reticle plate 32 to move towards the left or right. Simultaneously with such movement, reticle plate 30 moves towards the right or left, due to a similar extension 54 secured to traveling sleeve member 50. Wheel 46 is calibrated at 56 to provide direct range reading. Retention of the reticle plates in position is assisted by means of retaining springs 58 secured to the extensions 52 and 54.

Heretofore, reticles used in three dimensional devices were encased in a frame to maintain rigidity. This is necessary for the reticles are provided on flexible plastic material having a minimum of thickness and thus must be retained in a frame means. The necessity for frame means to retain a reticle plate is avoided in the present device: The new technique requires the preparation of a master reticle pattern on transparent material. The reticle is then transferred to diazo material having the desired color, blue or red, or to polaroid material with the proper polarity. Each reticle is then laminated between two transparent plastic sheets. This process is additionally superior to other methods, for, whereas diazo materials exposed to air will fade, this does not occur when the material is laminated. By this process each reticle is maintained rigid with a minimum of thickness so that each reticle can be used directly instead of being encased in a frame.

For the same purpose, thinness and rigidity, the stereo scene pair is also laminated between thin, transparent plastic sheets. The additional advantage of permanent stereo orientation is thus obtained for the stereo scene pair. The pair of stereo scenes 20, laminated together, is then positioned on field mask 10 overlying the reticle plates. Stereo scene plate 20 is secured to parallel motion means 61, which is anchored at the edge of field mask 10 by screws 62 extending through supports 64 and frame member 10. Links 66 and 68 are pivotally secured together at pivot point 70. In the same manner, links 72 and 74 are pivotally connected at 76 in parallel, but in spaced relationship with links 66 and 68. Cross link 78 joins pivot points 70 and 76. In addition, a second cross link 79, in spaced parallel relation to link 78, and attached to buttons 60, is used if so desired. In this manner, when stereo scene 20 is snapped onto buttons or pins 60, movement of the link members will move the stereo scene so that it is always parallel with the edges of field mask 10.

A closely realistic simulation of a telescopic stereoscopic rangefinder is provided by the structure herein described. Illumination from light source 24 is transmitted through opening 28 and projects the reticle and transparent scene onto screen 22 via lens 16. Parallel motion means 61 is adjusted to bring the portion of the scene to be ranged into view over opening 28. Due to the completely darkened area around opening 28, it appears to the observer that he is looking through a telescope. Reticle adjustment disc 46 is rotated to move plates 30 and 32 for appropriate parallax adjustment. When the reticles overlie each other, the ranging reticle is farthest from the observer. When the reticles are at maximum separation, the stereo reticle viewed is closest to the observer. The distance is read directly by means of calibrations 56 on the cam.

Obviously many modifications and variations of the present invention are possible in the light of the above teachings. It is therefore to be understood that within the scope of the appended claims the invention may be practiced otherwise than as specifically described.

I claim:

1. A training device for simulating telescopic range finder ranging by means of stereoscopic projection comprising, a frame member having an opening therein, stereoscopic reticle means secured to said frame member and positioned over said opening, means providing a stereoscopic scene overlying said stereoscopic reticle means, and means providing parallel movement secured to said frame member and to said stereoscopic scene means, said last named means comprising a cross-link member and link means pivotally secured to said cross-link member and to said frame member and stereoscene means whereby movement of the stereoscopic scene is always parallel with the edges of said frame member.

2. A training device for simulating telescopic range finder ranging by means of stereoscopic projection comprising, a frame member having an opening therein, stereoscopic reticle means secured to said frame member and positioned over said opening, means providing a stereoscopic scene overlying said stereoscopic reticle means, and means providing parallel movement secured to said frame member and to said stereoscopic scene means, said last named means comprising a parallelogram having link members, the parallel link members being pivotally secured to each other and a pair of additional link members, said last named link members being pivotally secured to said parallelogram and to said frame member whereby movement of the stereoscopic scene is always parallel with the edges of the frame member.

3. In a training device for simulating telescopic range finder ranging by means of stereoscopic projection comprising, a frame member with top and bottom edges and having an opening therein, means providing a stereoscopic scene overlying said frame member opening, means on said frame member and secured to said stereoscopic scene means for adjusting the position thereof in a motion parallel to the edges of the frame member and reticle means adjustably positioned between said frame member and stereoscopic scene means and overlying said opening, said reticle means comprising a pair of plate members having reticles thereon, and adjusting means secured to said frame member and to said reticle plates whereby the parallax distance between said reticles is adjusted only by movement of said reticle plate members in a motion parallel to the top and bottom edges of said frame member.

4. The combination of claim 3 wherein said adjusting means to provide parallax control comprises a bearing member extending from said frame member and an adjusting screw extending through said bearing member and operatively engaged with said plate members, said adjusting screw having oppositely pitched threads so that rotation thereof will provide simultaneous opposite and equal movement of said reticle plate members.

5. The combination of claim 4, wherein said reticle plate members include extension strips and sleeve members extending from said extension strips and receiving said adjusting screw therethrough, whereby the reticle plate members are adjusted in the same axial plane.

6. The combination of claim 3, wherein the stereoscopic scene adjusting means comprises a parallelogram having link members, the parallel link members being pivotally secured to each other and a pair of additional link members, said last named link members being pivotally secured to said parallelogram and to said frame member whereby movement of the stereoscopic scene is always parallel with the edges of the frame member.

References Cited in the file of this patent

UNITED STATES PATENTS

| Number | Name | Date |
|---|---|---|
| 1,756,062 | Holst | Apr. 29, 1930 |
| 1,816,181 | Eliel | July 28, 1931 |
| 1,921,630 | Mechau | Aug. 8, 1933 |
| 1,928,015 | Grow | Sept. 26, 1933 |
| 2,104,778 | Talley | Jan. 11, 1938 |
| 2,121,255 | Miller | June 21, 1938 |
| 2,194,682 | Abrams | Mar. 26, 1940 |
| 2,381,757 | Jones | Aug. 7, 1945 |
| 2,402,166 | Land | June 18, 1946 |
| 2,416,510 | Binda | Feb. 25, 1947 |
| 2,420,633 | Wittel et al. | May 13, 1947 |
| 2,424,088 | Furman et al. | July 15, 1947 |
| 2,458,439 | Staehle | Jan. 4, 1949 |
| 2,519,402 | Ruiz et al. | Aug. 22, 1950 |
| 2,652,326 | Ogle | Sept. 15, 1953 |